(No Model.) 2 Sheets—Sheet 1.

D. T. WOODMAN.
HORSE CONTROLLING DEVICE.

No. 476,109. Patented May 31, 1892.

Witnesses
Wm. F. Luider
Van Buren Hillyard

Inventor
Daniel T. Woodman.
By his Attorneys
R. S. & A. P. Lacey (No Model.) 2 Sheets—Sheet 2.

D. T. WOODMAN.
HORSE CONTROLLING DEVICE.

No. 476,109. Patented May 31, 1892.

Witnesses
Wm. L. Luden.
Van Buren Hillyard.

Inventor
Daniel T. Woodman.
By his Attorneys
R. S. & A. P. Lacey.

UNITED STATES PATENT OFFICE.

DANIEL TITCOME WOODMAN, OF BLOCKSBURG, CALIFORNIA.

HORSE-CONTROLLING DEVICE.

SPECIFICATION forming part of Letters Patent No. 476,109, dated May 31, 1892.

Application filed August 14, 1891. Serial No. 402,681. (No model.)

*To all whom it may concern:*

Be it known that I, DANIEL TITCOME WOODMAN, a citizen of the United States, residing at Blocksburg, in the county of Humboldt and State of California, have invented certain new and useful Improvements in Horse-Controlling Devices; and I do hereby declare the following to be a full, clear, and exact description of the invention, such as will enable others skilled in the art to which it appertains to make and use the same.

This invention relates to horse-controlling devices which are applied to the vehicle and brought into efficient service by the forward movement of the animal when left standing and the mechanism thrown in gear with one of the wheels or any rotating part revolved by the wheels of the vehicle.

The object of the invention is the provision of simple, positive, and efficient means for controlling the animal in the event of his becoming fractious or attempting to run away when left standing.

The improvement consists of the novel features and the peculiar construction and combination of the parts, which will be hereinafter more fully described and claimed, and which are shown in the annexed drawings, in which—

Figure 1:
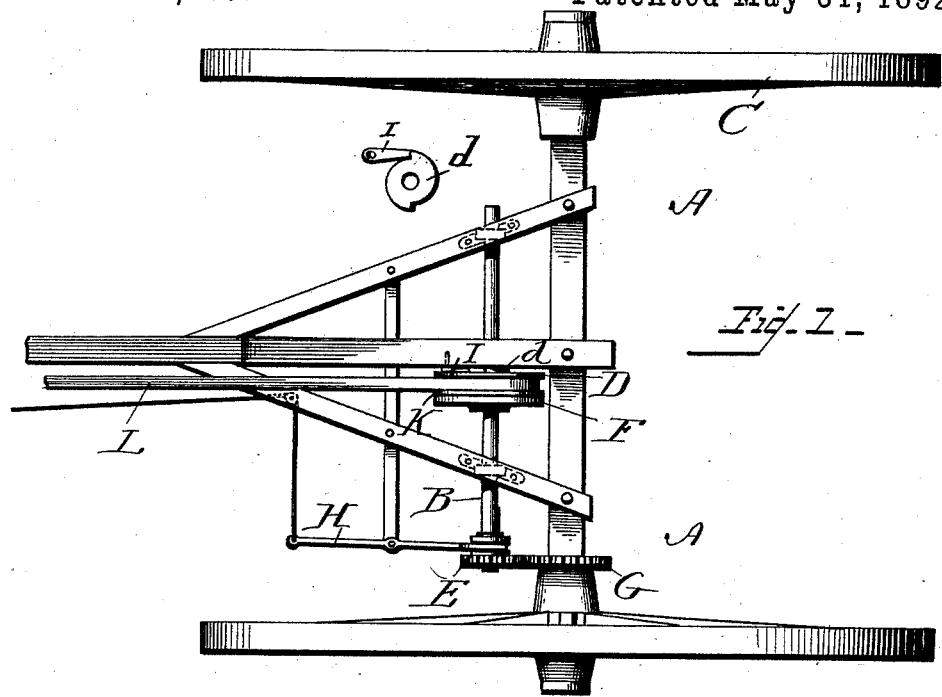
Figure 2:
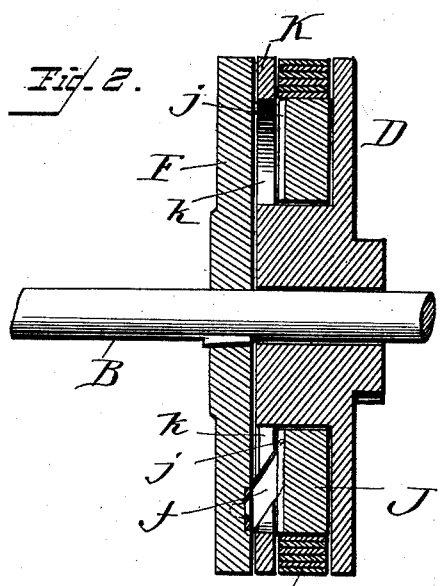
Figure 3:
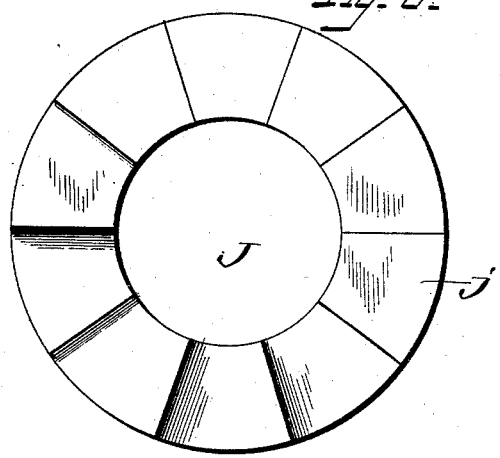
Figure 4:
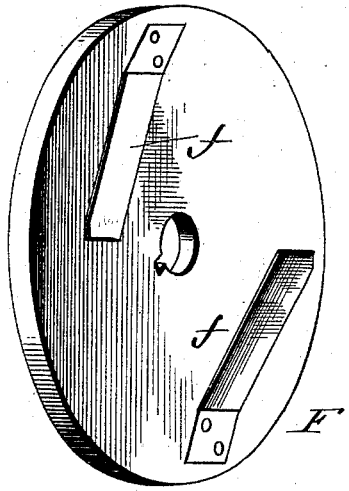
Figure 5:
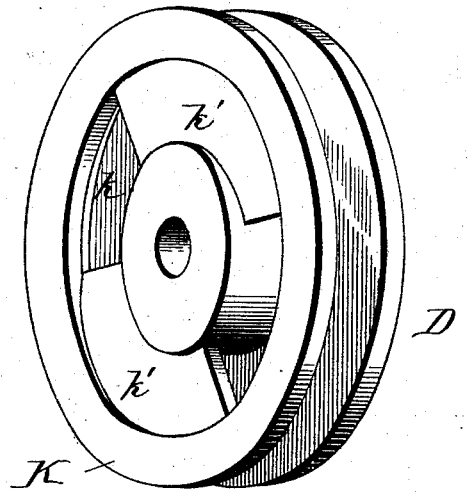
Figure 6:
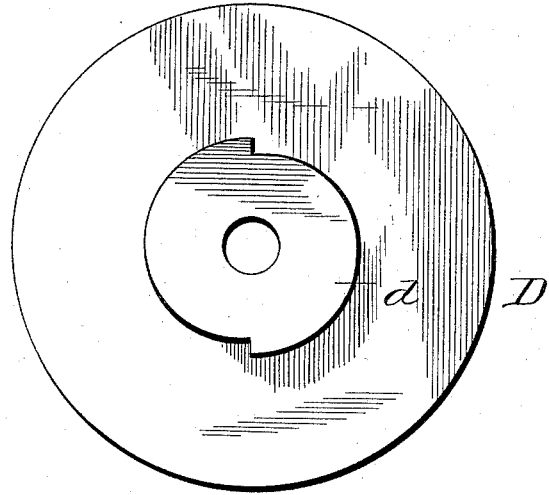

Figure 1 is a top plan view of the running-gear of a vehicle of ordinary construction, the body being removed to show the controlling mechanism, which is preferably located beneath the vehicle-body, and showing in a detached view the relative arrangement of the ratchet and pawl for preventing the turning of the drum to unwind the hitching-strap. Fig. 2 is a horizontal section of the drum, the annulus loosely mounted on the drum, and the disk carrying the pawls which cause the said drum and annulus to rotate with the shaft to which the pawl-carrying disk is keyed, one of the said pawls being shown in engagement with the said annulus. Fig. 3 is a detached view of the annulus on which the controlling-strap is wound and which has ratchet-teeth on its side, and which is loosely mounted on the cylindrical portion of the drum. Fig. 4 is a perspective view of the pawl-supporting disk detached, having the pawls attached thereto. Fig. 5 is a view of the drum detached, showing the openings in the head through which the pawls carried by the said disk project to engage with the teeth on the said annulus, and showing the cam portions between the said openings. Fig. 6 is a side view of the drum, showing the ratchet-wheel, which is engaged by a suitable pawl on the running-gear to prevent the drum from turning to unwind the hitching-strap.

The running-gear A may be of any approved construction and is adapted to support the controlling mechanism. The shaft B, journaled in suitable bearings on the running-gear, supports the drum D and the disk F, the former being loosely mounted on the shaft B and the latter keyed thereon to revolve with the said shaft. The gear-wheel E, mounted on the shaft B, is adapted to mesh with the pinion G on the wheel C and is moved on the said shaft in and out of gear with the said pinion by means of the shipper-lever H. The spring-dog I is constructed to engage with the ratchet-wheel *d* on the side of the drum D and prevent the said drum from turning to unwind the hitching-strap.

The annulus J is mounted on the cylindrical portion of the drum and is provided on one side with ratchet-teeth *j*, which are engaged by the pawls *f* on the disk F to effect a turning of the annulus and the drum with the said shaft B when winding the hitching-strap. The head K of the drum is provided with openings *k*, through which the pawls *f* reach to engage with the ratchet-teeth *j*. The solid portions *k'* between the openings *k* taper in their circumferential length, forming cams on which the pawls *f* ride to disengage the said pawls from the annulus to permit the unwinding of the hitching-strap. When the gear-wheel E is in gear with the pinion or toothed rim G and the vehicle is moved forward, the pawls *f* project through the openings *k* and engage with the teeth *j* and cause the disk F, drum D, and the annulus J to turn together and wind up the hitching-strap L. One end of the strap L is secured to the annulus J, and the other end is connected with the bit in the usual manner.

It will be observed that the head K is an integral portion of the drum D, and the openings *k* formed therein permit the pawl *f* to reach through the said head to engage with the teeth *j* on the side of the annulus. The rotation of the shaft B in the proper direction causes the pawls f to engage with the teeth j and rotate the annulus J, so as to wind up the hitching-strap. It will be observed that the pawls f extend across the path of the head K. Hence they engage with the same and effect a rotation of the drum D. With the parts thus relatively disposed the drum, annulus, and disk become in effect one drum which is keyed to the shaft B through the disk F. Hence to prevent the shaft B from turning so as to unwind the hitching-strap, the parts remaining in the same relation, a pawl I of any ordinary construction and arrangement is provided to engage with the teeth d on the side of the drum D, the pawl I being fastened to a suitable portion of the running-gear.

When the shaft B is thrown out of gear with the drive-wheel, the said shaft will turn under the strain on the hitching-strap and carry the disk F around with it. This operation causes the free ends of the pawls f to ride on the cam portions k' on the drum-head K, and disengages the said pawls from the teeth j of the annulus, thereby permitting the annulus to be turned freely in either direction. The drum D can be turned in one direction only—i. e., in a direction to wind up the hitching-strap. Again, should the animal advance too far and the hitching-strap be drawn taut, the annulus is released on the animal backing, thereby permitting the hitching-strap to slacken. The hitching-strap cannot be wound by the animal backing. Hence it will be seen that the sole purpose of the pawl I and ratchet-teeth d is to hold the drum D from turning in a reverse direction to that necessary to wind up the hitching-strap. Inasmuch as the drum D has motion in one direction only—i. e., with the annulus J, disk F, and shaft B to wind up the hitching-strap—obviously some provision had to be made to permit the unwinding of the said hitching-strap. Hence the annulus F is loosely mounted on the drum D and the disk F keyed to the shaft B and provided with pawls f, which are constructed to engage with the said annulus in the manner hereinbefore set forth to cause the same to turn and wind up the hitching-strap and be disengaged from the said annulus at the proper time to permit it to turn freely in an opposite direction to unwind the said hitching-strap.

Having thus described my invention, what I claim, and desire to secure by Letters Patent, is—

1. In a horse-controlling mechanism, the combination, with a shaft adapted to be rotated from a wheel of the vehicle, of a drum loosely mounted on the said shaft, an annulus lossely mounted on the cylindrical portion of the drum and having teeth on one side, a disk secured on the shaft to revolve therewith, pawls connected with the said disk and adapted to project through openings in a head of the drum and engage with the teeth on the annulus, and a controlling-strap connected with the said annulus, substantially as and for the purpose described.

2. In a horse-controlling mechanism, the combination, with a shaft adapted to be rotated from a wheel of the vehicle, of a drum loosely mounted on the said shaft and having openings in a head thereof and cam portions between the said openings, an annulus loosely mounted on the cylindrical portion of the drum and having teeth on one side, a disk secured on the shaft to revolve therewith, pawls connected with the said disk and adapted to project through the said openings in the head of the drum and engage with the teeth on the annulus, and a controlling-strap connected with the said annulus, substantially as and for the purpose described.

3. In a horse-controlling mechanism, the combination, with a shaft adapted to be rotated from a wheel of the vehicle, of a drum loosely mounted on the said shaft and having openings in a head thereof and cam portions between the said openings, a ratchet-wheel and pawl to hold the drum from turning in an opposite direction to the winding of the hitching-strap, an annulus loosely mounted on the cylindrical portion of the drum and having teeth on one side, a disk secured on the shaft to revolve therewith, pawls connected with the said disk and adapted to project through openings in a head of the drum and engage with the teeth on the annulus, and a controlling-strap connected with the said annulus, substantially as and for the purpose described.

4. A horse-controlling mechanism comprising shaft B, gearing between the shaft and a wheel of the vehicle, a shipping-lever to throw the said gearing in and out of gear, a drum loosely mounted on the shaft and having openings k in a head thereof and having cam portions k' between the said openings, an annulus loosely mounted on the cylindrical portion of the drum and having teeth on one side, a disk secured on the shaft to revolve therewith, yielding pawls connected with the said disk and adapted to project through openings in a head of the drum and engage with the teeth on the annulus, and a controlling-strap connected with the said annulus, substantially as and for the purpose described.

In testimony whereof I affix my signature in presence of two witnesses.

DANIEL TITCOMB WOODMAN.

Witnesses:
PETER T. HAMANS,
VICTOR HOPE.